United States Patent
Saleh et al.

(10) Patent No.: US 11,030,791 B2
(45) Date of Patent: Jun. 8, 2021

(54) CENTROID SELECTION FOR VARIABLE RATE SHADING

(71) Applicant: Advanced Micro Devices, Inc., Santa Clara, CA (US)

(72) Inventors: Skyler Jonathon Saleh, La Jolla, CA (US); Pazhani Pillai, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/226,103

(22) Filed: Dec. 19, 2018

(65) Prior Publication Data
US 2020/0202605 A1 Jun. 25, 2020

(51) Int. Cl.
| | |
|---|---|
| *G06T 7/40* | (2017.01) |
| *G06T 15/00* | (2011.01) |
| *G06T 1/20* | (2006.01) |
| *G06K 9/62* | (2006.01) |
| *G06T 7/90* | (2017.01) |
| *G06T 17/20* | (2006.01) |

(52) U.S. Cl.
CPC .......... *G06T 15/005* (2013.01); *G06K 9/6202* (2013.01); *G06T 1/20* (2013.01); *G06T 7/40* (2013.01); *G06T 7/90* (2017.01); *G06T 17/20* (2013.01)

(58) Field of Classification Search
CPC .......... G06T 15/005; G06T 1/20; G06T 7/40; G06T 11/001; G06T 15/80; G06T 7/90; G06T 17/20; G06K 9/6202
See application file for complete search history.

(56) References Cited

U.S. PATENT DOCUMENTS

| | | | | |
|---|---|---|---|---|
| 7,456,846 B1* | 11/2008 | King | ..................... | G06T 15/005 345/613 |
| 8,044,956 B1* | 10/2011 | Kilgard | ................. | G06T 15/503 345/426 |
| 2002/0015041 A1* | 2/2002 | Naegle | .................... | G06F 7/509 345/501 |
| 2003/0117409 A1* | 6/2003 | Lefebvre | ............... | G06T 11/203 345/581 |
| 2010/0002000 A1* | 1/2010 | Everitt | .................. | G06T 15/503 345/426 |
| 2013/0257885 A1* | 10/2013 | Vaidyanathan | ....... | G06T 15/503 345/582 |
| 2017/0293995 A1 | 10/2017 | Saleh et al. | | |

* cited by examiner

*Primary Examiner* — Antonio A Caschera
(74) *Attorney, Agent, or Firm* — Volpe Koenig

(57) ABSTRACT

A technique for determining the centroid for fragments generated using variable rate shading. Because the barycentric interpolation used to determine texture coordinates for pixels is based on the premise that the point being interpolated is within the triangle, centroids that are outside of the triangle can produce undesirable visual artifacts. Another concern, however, is that the further the centroid is from the center of a pixel, the less accurate quad-based pixel derivatives become for attributes of that pixel. To address these concerns, the position of the sample that is both covered by the triangle and the closest to the center of the pixel, out of all covered samples of the pixel, is used as the centroid for a partially covered pixel. For a fully covered pixel (all samples in a pixel are covered by a triangle), the center of that pixel is used as the centroid.

20 Claims, 7 Drawing Sheets

CENTROID SELECTION FOR VARIABLE RATE SHADING

BACKGROUND

Three-dimensional ("3D") graphics processing pipelines perform a series of steps to convert input geometry into a two-dimensional ("2D") image for display on a screen. Some of the steps include rasterization and pixel shading. Rasterization involves identifying which pixels (or sub-pixel samples) are covered by triangles provided by stages of the pipeline prior to the rasterizer. The output of rasterization includes quads—a block of 2×2 pixels—and coverage data that indicates which samples are covered by the pixels of the quads. The pixel shader shades the pixels of the quads, and the pixels of the quads are then written to a frame buffer. Because pixel shading is very resource-intensive, techniques are constantly being developed to improve efficiency of pixel shading.

BRIEF DESCRIPTION OF THE DRAWINGS

A more detailed understanding can be had from the following description, given by way of example in conjunction with the accompanying drawings wherein.

DETAILED DESCRIPTION

A technique for determining the centroid for fragments generated using variable rate shading is provided. Variable rate shading is a technique whereby pixel shading occurs at a resolution that can be lower than the resolution of the render target. In this technique, the pixel shader determines colors for "large" pixels and then applies those colors to multiple corresponding pixels in a render target.

An issue arises in centroid determination when using variable rate shading for pixels at the edge of a triangle. A centroid is the point at which pixel attributes such as texture coordinates are evaluated. Because the barycentric interpolation used to determine texture coordinates for pixels is based on the premise that the point being interpolated is within the triangle, centroids that are outside of the triangle can produce undesirable visual artifacts. Thus it is advantageous to select a point within the covered portion of a fragment at the edge of a triangle as the centroid. Another concern, however, is that the further the centroid is from the center of a pixel, the less accurate the quad-based pixel derivatives become. More specifically, fragments are rendered together in quads to allow for easy calculation of attribute derivatives for purposes such as texture mipmap selection and texture filtering selection. The way these derivatives are calculated is based on the premise that centroids are one pixel width apart. Thus centroids far from the center of one pixel (but not others) will disrupt quad derivative calculation. To address the above concerns, the position of the sample that is both covered by the triangle and the closest to the center of the pixel, out of all covered samples of the pixel, is used as the centroid for a partially covered pixel. For a fully covered pixel (all samples in a pixel are covered by a triangle), the center of that pixel is used as the centroid.

Figure 1:
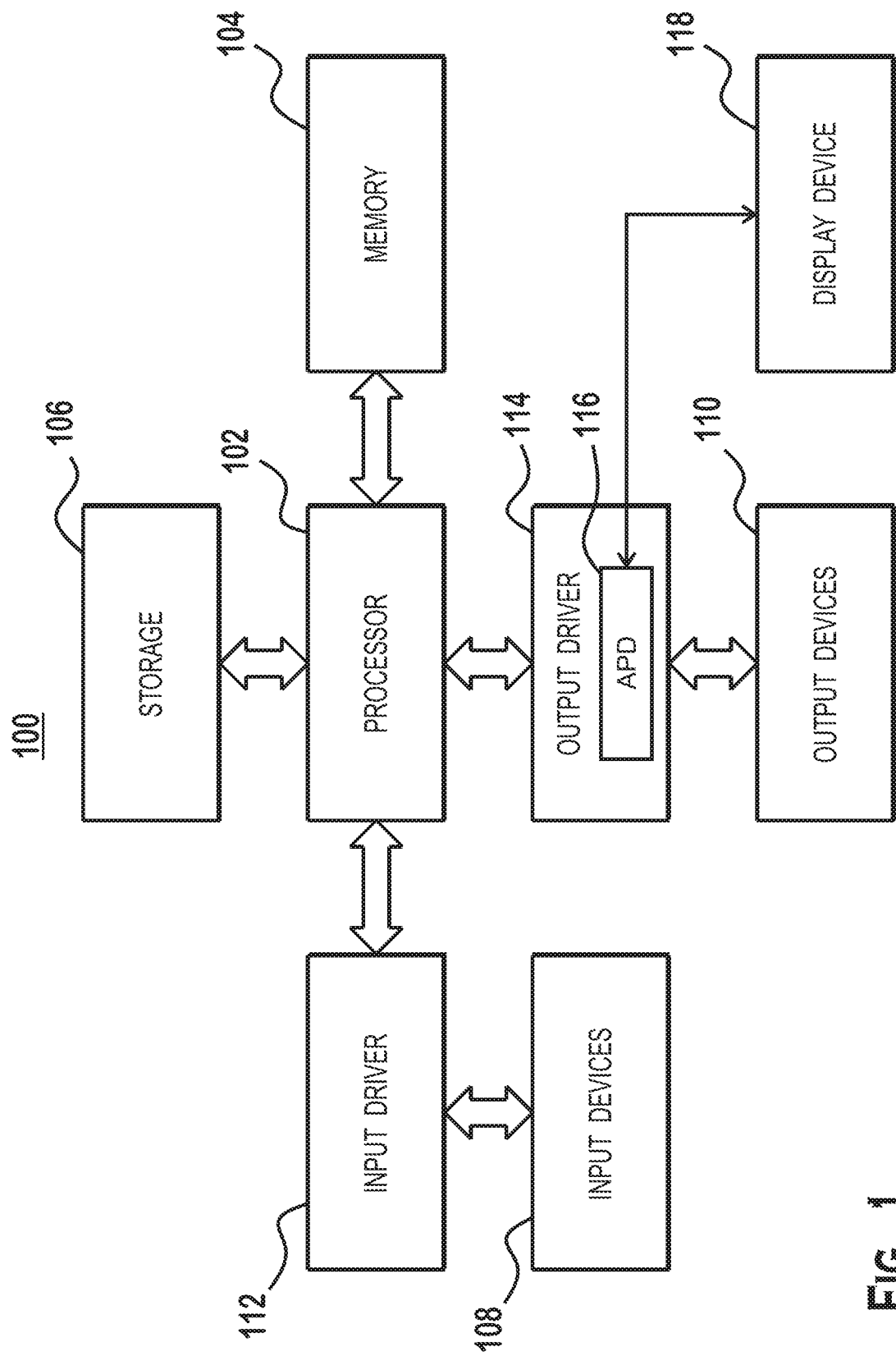
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
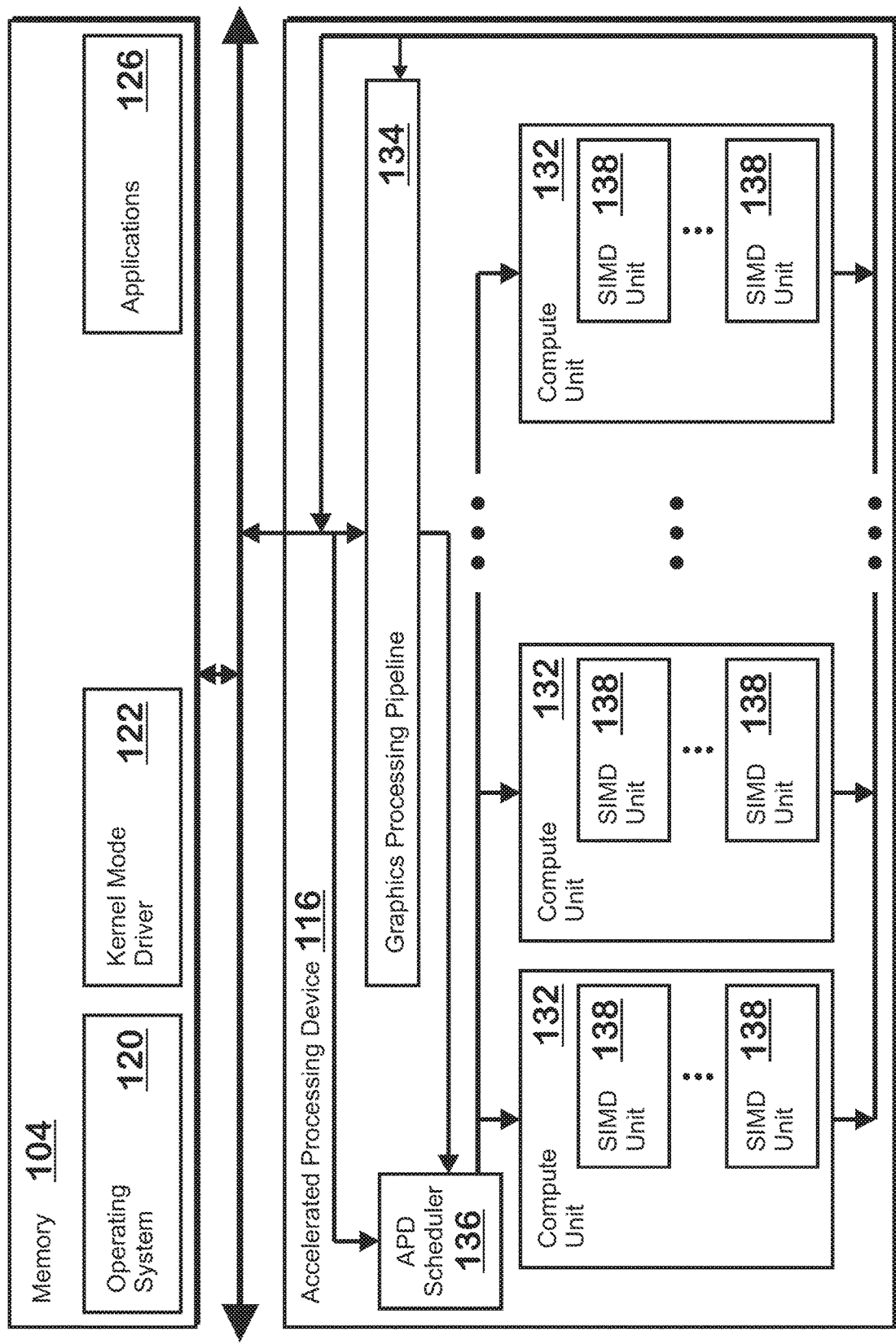
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
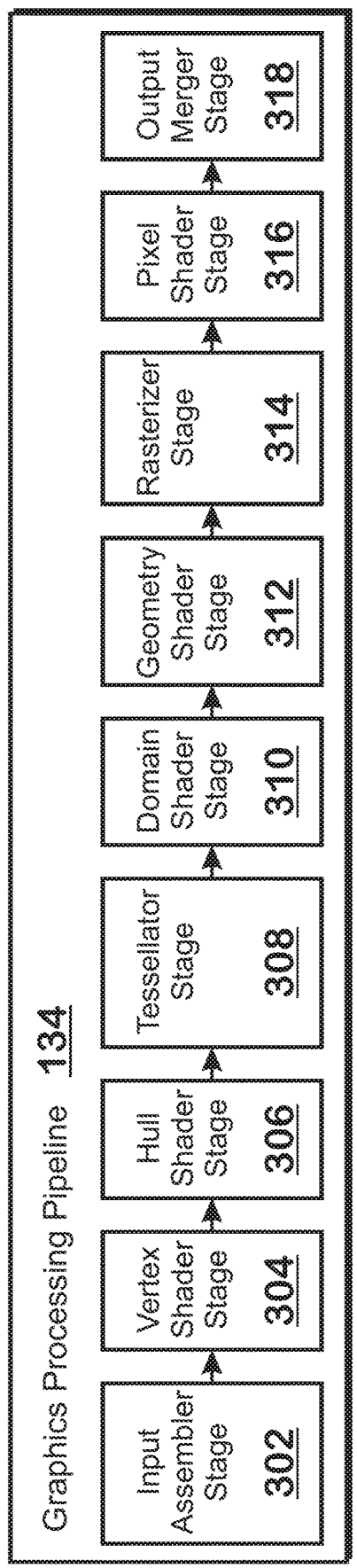
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132, that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

In one mode of operation, the rasterization performed by the rasterizer stage 314 is done at the same resolution as pixel shading performed by the pixel shader stage 316. By way of more detailed background than the description provided above, the rasterizer stage 314 accepts triangles from earlier stages and performs scan conversion on the triangles to generate fragments. The fragments are data for individual pixels of a render target and include information such as location, depth, and coverage data, and later, after the pixel shader stage, shading data such as colors. The render target is the destination image to which rendering is occurring (i.e., colors or other values are being written).

Typically, the fragments are grouped into quads, each quad including fragments corresponding to four neighboring pixel locations (that is, 2×2 fragments). Scan conversion of a triangle involves generating a fragment for each pixel location covered by the triangle. If the render target is a multi-sample image, then each pixel has multiple sample locations, each of which is tested for coverage. The fragment records coverage data for the samples within the pixel area that are covered by the triangle. The fragments that are generated by the rasterizer stage 314 are transmitted to the pixel shader stage 316, which determines color values for those fragments, and may determine other values as well.

Performing rasterization and pixel shading at the same resolution means that for each fragment generated by the rasterizer, the pixel shader 316 performs a calculation to determine a color for that fragment. In other words, the area of screen-space occupied by a pixel is the same area as the precision with which colors are determined. In one example, in the SIMD-based hardware of the compute units 132, each fragment generated by the rasterizer stage 314 is shaded by a different work-item. Thus, there is a one-to-one correspondence between generated fragments and work-items spawned to shade those fragments. Note that the rasterizer stage 314 typically performs depth testing, culling fragments occluded by previously-rendered fragments. Thus, there is a one-to-one correspondence between fragments that survive this depth culling and work-items spawned to color those surviving fragments, although additional work-items may be spawned to render helper pixels for quads, which are ultimately discarded. Helper pixels are fragments that are not covered by a triangle but that are generated as part of a quad anyway to assist with calculating derivatives for texture sampling. Another way to understand the mode of operation in which rasterization is performed at the same resolution as shading is that the resolution at which the edges of a triangle can be defined is equivalent to the resolution at which colors of that triangle can be defined.

One issue with the above mode of operation, in which rasterization occurs at the same resolution as pixel shading occurs for triangles that have a fixed color or low frequency change in color. For such triangles, pixel shading operations on nearby fragments produce the same or similar color and are effectively redundant. A similar result could therefore be performed with a much smaller number of pixel shader operations. Thus, it is advantageous to decouple the rasterization resolution from the shading resolution, and a technique for allowing rasterization to occur at a different resolution than pixel shading is provided below. The advantage of such a technique is a reduction in the number of pixel shader operations being performed, which reduces processing load and improves performance.

Figure 4:
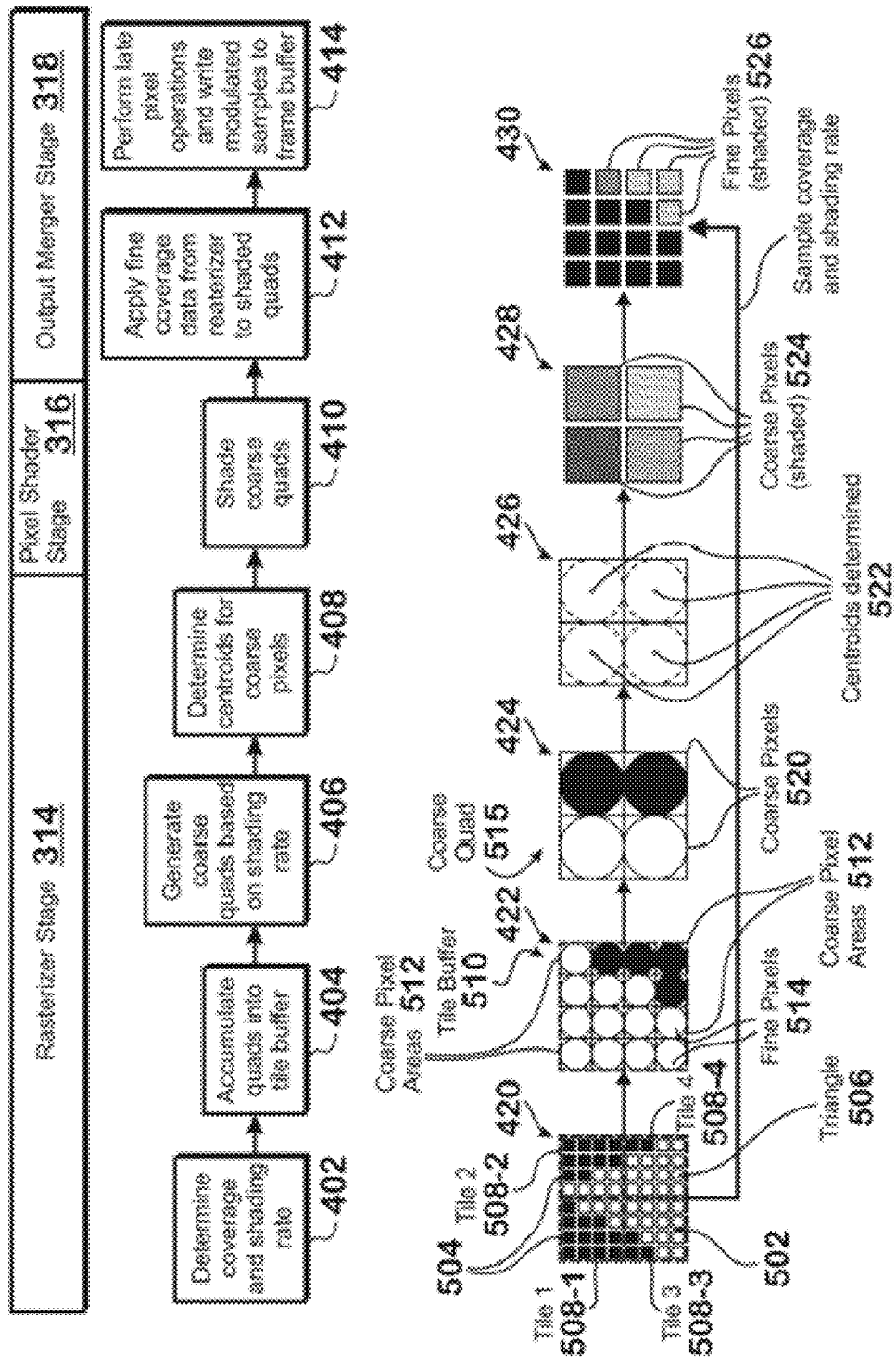
FIG. 4 illustrates a technique for performing rasterization at a different resolution than pixel shading, according to an example.

FIG. 4 illustrates a technique for performing rasterization at a different resolution than pixel shading, according to an example. FIG. 4 illustrates a set of steps, provides an example pictorial illustration of the different steps, and illustrates which stages of the graphics processing pipeline 134 are associated with which steps.

The technique begins with step 402, where the rasterizer stage 314 rasterizes a triangle received from an earlier stage of the graphics processing pipeline 134. This rasterization is done at the resolution of the render target, meaning that a fragment is generated for each pixel of the render target.

Rasterization involves determining the pixels of the render target that are covered by the triangle. For each such pixel that is covered, the rasterizer stage 314 generates a fragment. The render target may be a single sample render target or a multi sample render target. Multi sample render targets include multi sample pixels. A sample is a location for which coverage is determined. Multi-sample render targets are useful for techniques such as multi-sample anti-aliasing, which produces results that are visually more pleasing than single-sample anti-aliasing. Coverage is determined for each sample of such a pixel. Fragments generated by the rasterization stage 314 include coverage data that indicates which samples of the corresponding pixel of the render target are covered by the triangle.

The rasterizer stage 314 also performs depth testing at step 402. In one example, depth testing involves examining the depth value for each sample covered by the triangle and comparing those depth values to a depth buffer that stores depth values for already-processed triangles. The depth value for a particular sample is compared to the depth value stored at the depth buffer for the same position as the particular sample. If the depth buffer indicates that the sample is occluded, then that sample is marked as not covered and if the depth buffer indicates that the sample is not occluded, then that sample survives. The data indicating which sample locations are covered and not occluded is passed on to other parts of the graphics processing pipeline 134 for later processing as described elsewhere in this description.

Rasterization outputs fragments in 2×2 groups known as quads. More specifically, for each pixel of the render target that has at least one sample covered by the triangle, the rasterizer stage 314 generates a fragment. The rasterizer 314 creates quads from these fragments. Quads include fragments for an adjacent section of 2×2 pixels, even if one or more such fragments are completely not covered by the triangle (where "completely not covered" means that no samples of the fragment are covered by the triangle and not occluded). The fragments that are completely not covered are called helper pixels. Helper pixels are used by the pixel shader stage 316 to calculate spatial derivatives for shading. Often, these spatial derivatives are used for mipmap selection and filtering for textures, but the spatial derivatives can be used for other purposes.

Also at step 402, the rasterizer stage 314 determines one or more shading rates for the samples of the triangle. A shading rate defines the number of pixels that are shaded together in the pixel shader stage 316. More specifically, a shading rate determines how many pixel locations in the render target are given the color determined by a single work-item in the pixel shader stage 316. For example, if the shading rate is one quarter, then a work-item in the pixel shader stage 316 determines a color for four pixel locations in the render target. Note, the color is said to be determined for pixel locations rather than pixels because colors for some pixels may be discarded due to being outside of the triangle or being occluded based on a depth test. For example, if the shading rate is one quarter and one particular work-item therefore determines a color for four pixel locations of the render target, and if three of those pixel locations are outside of a triangle or occluded (and are thus helper pixels), then the work-item actually determines a color for only one pixel. However, it is possible for all pixel locations for which a work-item determines a color to be within a triangle and not occluded. In such a situation, a single work-item determines a color for four different pixels.

A rasterization illustration 420 shows a triangle 506, including pixels that are covered (covered pixels 502) and pixels that are not covered by the triangle (non-covered pixels 504). The rasterization illustration 420 covers only a portion of a render target (not shown)—it should be understood that rasterization occurs for other portions of the render target not shown. The portion shown is divided into four different tiles 508. These tiles 508 are part of a mechanism by which pixels are "downsampled" to allow for a decoupling of the rasterization resolution from the pixel shading resolution, as described in more detail below.

At step 404, the rasterizer stage 314 accumulates quads generated as the result of fine rasterization in step 402 into a tile buffer 510 as illustrated by the tile buffer illustration 422. The tile buffer 510 is a small memory that stores quads for a tile 508. In FIG. 4, the tile buffer 510 is the size of four 2-by-2-adjacent fine pixel quads (i.e., 8×8 pixels), but in other examples, the tile buffer 510 may store a different number of quads. The specific tile illustrated in tile buffer illustration 422 is tile 1 508-1. It should thus be understood that tile buffer illustration 422 does not illustrate tile 2 508-2, tile 3 508-3, or tile 4 508-4.

Fine pixels 514 are illustrated—these correspond to pixels at the resolution of the render target, and not the down-sampled resolution. The rasterizer stage 314 knows the order that quads are generated in, relative to screen position, and is thus able to determine when a quad is culled or not generated for a particular portion of a tile due to that portion of the tile not being covered at all by the triangle.

The tile buffer illustration includes coarse pixel areas 512. These are areas that correspond to coarse pixels at the down-sampled resolution. The size of a coarse pixel area 512 is dependent on the shading rate. Specifically, the size is equal to the reciprocal of the shading rate. For example, if the shading rate is ¼ (as illustrated in FIG. 4), then the size of a coarse pixel area is four fine pixels.

Note also that some portions of the tile buffer 510 may be empty. Specifically, if a quad corresponding to a portion of the screen of the tile buffer is not generated by the rasterizer stage 314 due to there being no covered pixels in that portion of the screen, then no quad for that portion of the screen is included in the tile buffer 510.

At step 406, the rasterizer stage generates coarse quads 515 based on the shading rate (as illustrated in coarse quad illustration 424) and the contents of the tile buffer 510. Specifically, one or more coarse quads 515 are generated based on the contents of the tile buffer 510 and the shading rate. The number of coarse quads 515 generated is equal to the size of the tile buffer 510 in fine pixels 514, divided by four (because a quad has 4 pixels), and multiplied by the shading rate. Thus if the tile buffer 510 is sixteen pixels 16, as in the example of FIG. 4, and the shading rate is one quarter, then the number of coarse quads 515 generated is equal to $^{16}\!/\!_4 * (¼) = 1$. For a similar tile buffer 510 and a shading rate of ½, 2 coarse quads are generated 515, and so on.

Each coarse quad 515 includes four coarse pixels 520. The coverage assigned to any particular coarse pixel 520 is the amalgamation of the coverage assigned to the fine pixels 514 that are "collapsed" into that coarse pixel 520. In some situations, such an amalgamation would result in a coarse pixel 520 having too much coverage data. More specifically, the graphics processing pipeline 134 may have a limitation on the number of bits that can be used to specify coverage data for a pixel. In this situation, when coverage data from fine pixels 514 is amalgamated into coverage data for a coarse pixel 520, that data is reduced in fidelity. The coverage data that remains would be geometrically representative of the coverage of the individual fine pixels. This idea will be discussed in greater detail with respect to FIG. 6. If a coarse quad 515 would be generated that has no coverage, then no such coarse quad 515 is generated. If the tile buffer 510 has not received any quads for a particular tile 508 of a render target, then the rasterizer stage 314 determines that no triangles exist that cover that tile 508 or that any quads generated for that tile 508 are occluded by other geometry. In that case, no coarse quads 515 are generated for that tile 508.

Note that the image below step 404 illustrates a single tile (tile 1 408-1) in the image below step 402. The image below step 406 illustrates a down-sampled (coarse) version of the pixels of tile 1 408-1. Note also that the term "fine rasterization data" refers to the coverage information in the "fine" resolution of the render target and not the down-sampled "coarse" rasterization data generated according to step 406.

At step 408, the rasterizer stage 314 determines the centroids for the coarse pixels 520 of the coarse quads (as illustrated in centroids determined 522). A centroid is a position at which attributes for a coarse pixel are evaluated. In one example, the color of a pixel is determined based on a texture map and the position of the centroid for the pixel. Specifically, the triangle to which a texture is applied has vertices. Each vertex is given a texture coordinate, which indicates the portion of a texture that is to be mapped to the triangle and correlates locations in the texture to locations within the triangle. For any given pixel in a triangle, the color for that pixel is determined by determining the appropriate position in the texture and then determining the color of that position in the texture. Typically, barycentric interpolation is used to determine this position. Barycentric interpolation interpolates the texture coordinates of the three vertices of the triangle based on the relative location of the position of the pixel to the location of the three vertices. There are certain issues that arise in determining a centroid for coarse pixels at the edges of triangles, and these are discussed in detail with respect to FIGS. 6 and 7.

At step 410, the pixel shader stage 316 shades the generated coarse quads 515 to generate shaded coarse pixels 524 as illustrated in pixel shading illustration 524. This shading is done in a standard way—for example, each coarse pixel 520 launches as a work-item which is processed in the SIMD hardware. As described above, each coarse pixel has attributes (such as texture coordinates, normals, vertex colors, and world position, or other attributes) determined based on the centroid. In many situations, the pixel shader stage 316 determines colors for the coarse pixels based on the evaluation of the texture coordinates and based on a texture, itself, and filtering modes applied, if applicable.

At step 412, the output merger stage 318 applies the fine coverage data determined at step 412 to the shaded coarse pixels 524 as illustrated in modulation illustration 526. Specifically, each shaded coarse pixel 524 is cloned based on the shading rate, with each clone getting the color of the shaded coarse pixel 524, to generate shaded fine pixels 526. Coverage is applied to each shaded fine pixel 526 based on the data in the sample coverage generated by the rasterizer stage 314. If a sample is not covered in that data, then that sample is negated (i.e., its coverage is set to not covered) in the corresponding cloned fine pixel. A cloned pixel that has no coverage in the data generated by the rasterizer stage 314 is likewise set to have no pixel coverage. The operations involved in step 412 may be referred to as "modulation" here. For example, it may be said that the shaded coarse pixels 524 are modulated by the coverage data generated by the rasterization stage 314 to generate the shaded fine pixels 526.

At step 414, the shaded fine pixels 526, having coverage modified by the sample coverage from the rasterizer stage 314, are written to the render target. Other late pixel operations may be applied before writing to the render target, such as late z operations, blending, or other operations.

Figure 5:
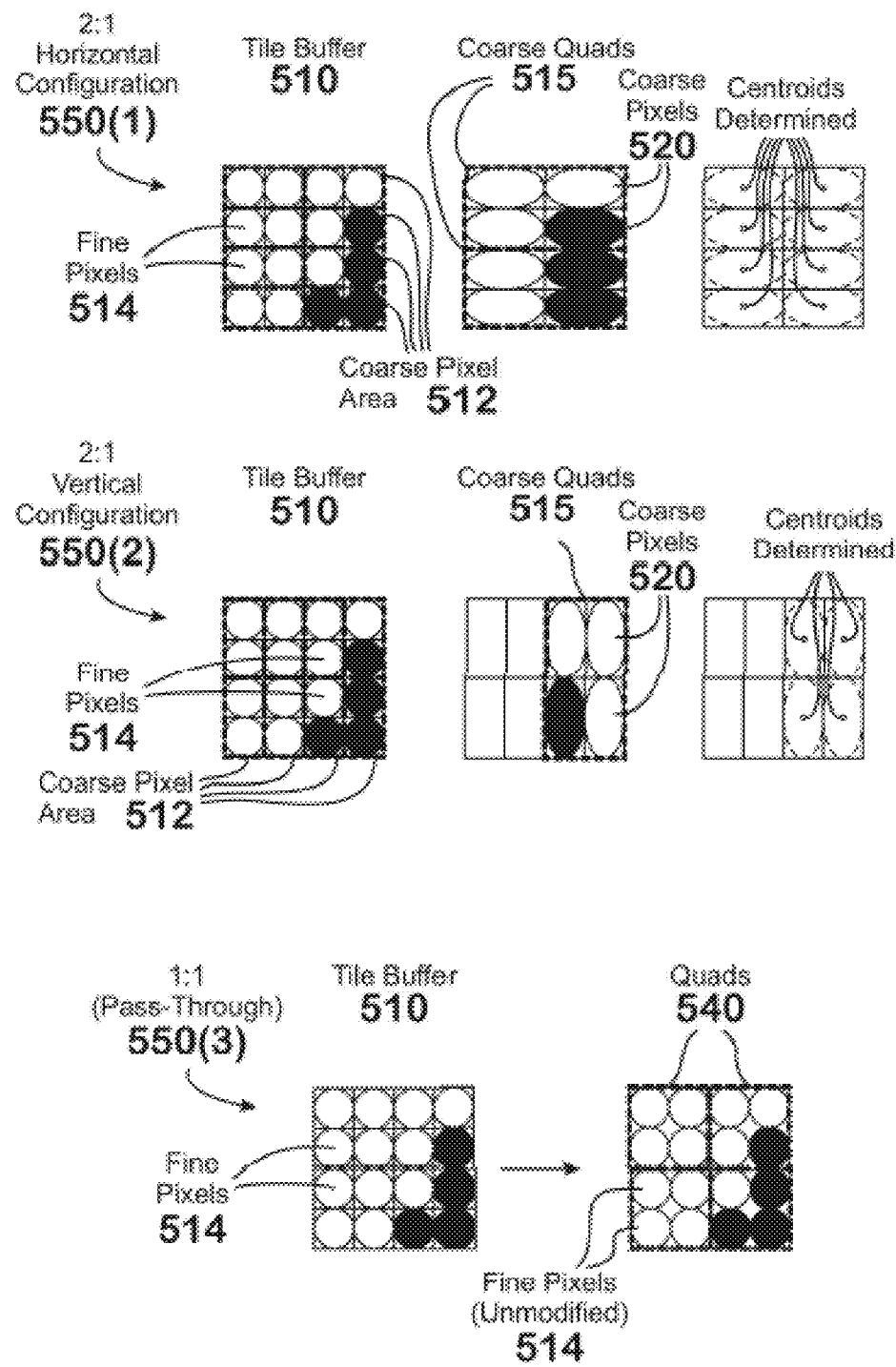
FIG. 5 illustrates coarse quad generation for shading rates other than one quarter, according to some examples.

FIG. 5 illustrates the tile buffer 510, and coarse quad generation from the contents of the tile buffer 510, for shading rates other than one quarter, according to some examples. Specifically, a 2:1 horizontal configuration 550 (1), a 2:1 vertical configuration 550(2), and a 1:1 pass-through configuration 550(3) are shown.

The 2:1 horizontal configuration 550(1) has a one half shading rate in which two horizontally neighboring fine pixels 514 are combined into coarse pixels 520. Similarly, the 2:1 vertical configuration 550(2) has a one half shading rate in which two vertically neighboring fine pixels 514 are combined into coarse pixels 520. For both of the illustrated 2:1 configurations, as with the one quarter shading rate, four coarse pixels 520 are included within each coarse quad 514. Because the tile buffer 510 corresponds to eight coarse pixels 520, two quads are included in that tile buffer 510. Additionally, each coarse pixel 520 is assigned the coverage of the fine pixels 514 that are accumulated into the coarse pixel 520, with coverage fidelity being reduced if the coarse pixels 520 do not include enough bits to store all coverage data for the fine pixels 514.

As with the 4:1 coarse pixels illustrated in FIG. 4, the positions of the 2:1 coarse pixels are set according to which samples are covered by each coarse pixel. Additional details are provided with respect to FIGS. 6 and 7.

In the 1:1 configuration 550(3), no special actions are performed. There are no coarse quads—the quads 540 generated by rasterization are output without modification to be shaded by the pixel shader stage 316.

It should be understood that within a single frame, and even within a single triangle, different shading rates can be used for different pixels. Thus, one portion (such as a central portion) of a triangle can be shaded at a 4:1 rate and another portion (such as edge portions) of a triangle can be shaded at a 2:1 rate or a 1:1 rate.

Figure 6:
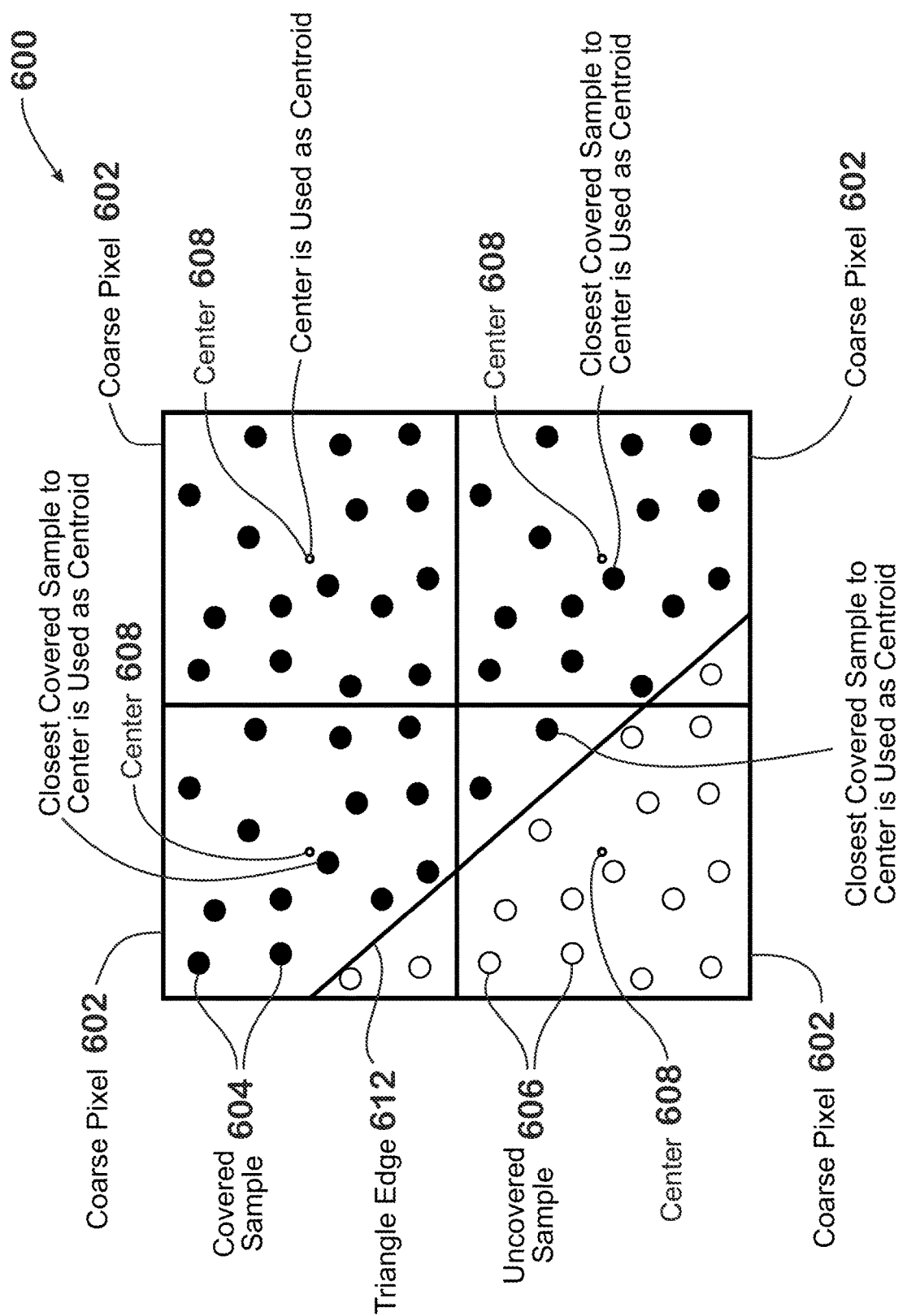
FIG. 6 illustrates a technique for determining a centroid for a coarse pixel, according to an example.

FIG. 6 illustrates a technique for determining a centroid for a coarse pixel, according to an example. A coarse quad 600 is illustrated. The coarse quad 600 includes four coarse pixels 602. A triangle edge 612 is illustrated. The inside of the triangle is in the upper-right direction from the triangle edge 612 and the outside of the triangle is in the lower-left direction from the triangle edge 612. Each coarse pixel 602 has a number of samples (specifically, 16). Some of these samples are determined to be covered by the triangle. These samples are covered samples 604 and are shown colored-in in FIG. 6. Other samples are determined to not be covered by the triangle. These samples are uncovered samples 606 and are shown in outline in FIG. 6.

The centroid of a particular coarse pixel is determined in the following manner. If all of the samples of a coarse pixel are considered covered, then the centroid of the coarse pixel is the center of that coarse pixel (i.e., midway between the left and right extents of the pixel and the top and bottom extents of the pixel). If not all of the samples of a coarse pixel are considered covered, then the centroid is the covered sample that is closest to the center of the pixel.

In the example of FIG. 6, for the top-right coarse pixel 602, all samples are covered. Thus the centroid is the center 608 of that pixel. For the top-left coarse pixel 602, the bottom-left coarse pixel 602, and the bottom-right coarse pixel 602, some, but not all of the samples are covered. In each of those situations, the centroid is determined as the closest covered sample to the center. In the top-left and the bottom-right coarse pixels 602, the closest covered sample to the center is closest sample to the center and thus the position of this sample is used as the centroid. For the bottom-left coarse pixel 602, the closest sample to the center is not covered by the triangle. Only two samples are covered in that coarse pixel 602. The bottom-right one is closer than the top-left one and thus the position of that sample is used as the centroid for the bottom-left coarse pixel 602.

In some implementations, distance between the samples and the center is determined as a Manhattan distance for ease of computation. A Manhattan distance is the difference in x-coordinate values added to the difference in y-coordinate values. Thus if the center has coordinates 3, 5 and a sample has coordinates 5, 4, the Manhattan distance is 2+1=3. A Manhattan distance has the advantage of being easy to implement. In hardware, multiple Manhattan distance calculators may be provided for each pixel (e.g., one for each sample) and the distance check can occur in parallel. The lowest distance would be selected after distance calculation, and the position of the sample associated with that lower distance would be used as the centroid for the pixel.

Once the centroid is determined, the centroid is used as the position to evaluate attributes for the coarse pixel 602. More specifically, as described above, when using the variable shading rate described elsewhere herein, attributes such as color are calculated by the pixel shader stage 316 once for a coarse pixel. Then, when fine pixels are generated for the coarse pixel, the calculated attributes are duplicated for each such fine pixel.

One of the determined attributes is texture coordinates for the pixel. As described above, a texture coordinate describes the location in a texture from which a texture sampling occurs. For triangles, the texture coordinate is obtained by performing barycentric interpolation on the texture coordinates of the triangle vertices based on the relative location of the centroid and those texture coordinates. Thus the centroid position indicates the texture position that is to be sampled.

One advantage of the technique of FIG. 6 is that visual artifacts associated with using a centroid that is not inside a triangle are avoided or minimized. More specifically, a texture coordinate (i, j) is calculated for each pixel using barycentric interpolation that is based on the areas of three triangles formed by different sets of two vertices of the triangle and the centroid (for example, if the triangle has vertices A, B, and C, and the centroid is vertex X, these three triangles are ABX, BCX, and CAX, and the areas of these triangles are $area_{ABX}$, $area_{BCX}$, and $area_{CAX}$, respectively). More specifically, the vertices of the triangle have texture coordinates $(u_A, v_A)$, $(u_B, v_B)$, and $(u_C, v_C)$.

The texture coordinate for the pixel are calculated as $(u_{pixel}, v_{pixel}) = area_{BCX}*(u_A, v_A) + area_{CAX}*(u_B, v_B) + area_{ABX}*(u_C, v_C)$. If a centroid outside of the triangle is used, then visual artifacts may result because the areas of the triangles are not as expected (for example, the areas do not add up to 1). Thus while selecting the center of a pixel as the centroid might be computationally simple to implement, doing so would lead to visual artifacts. These artifacts are magnified with variable rate shading because the center of large pixels (e.g., 2×2 pixels) may be much farther from the actual covered portion of that pixel than with normal sized pixels where variable rate shading is used.

It might be thought of as "most accurate" to choose, as the centroid, the center of the portion of a partially covered pixel that is actually covered by the triangle. However, selecting a centroid that is too far from the actual center of a pixel presents other issues. Specifically, as described elsewhere herein, pixels are typically rendered in quads, which allows the derivatives of attributes such as texture coordinates to be taken between neighboring pixels. These derivatives are used for techniques such as mipmap level selection and texture filtering mode adjustments. The derivatives are taken by calculating the differences between the attributes for neighboring pixels. Generally, the derivatives make the assumption that the distance between the location corresponding to the attributes is equal to the width of a pixel. However, when the centroid of one or more pixels is not at the center of the pixel, such as when that pixel is only partially covered, this assumption is not true. This is why, for partially covered pixels, the centroid used is the closest covered sample to the center of the pixel.

Figure 7:
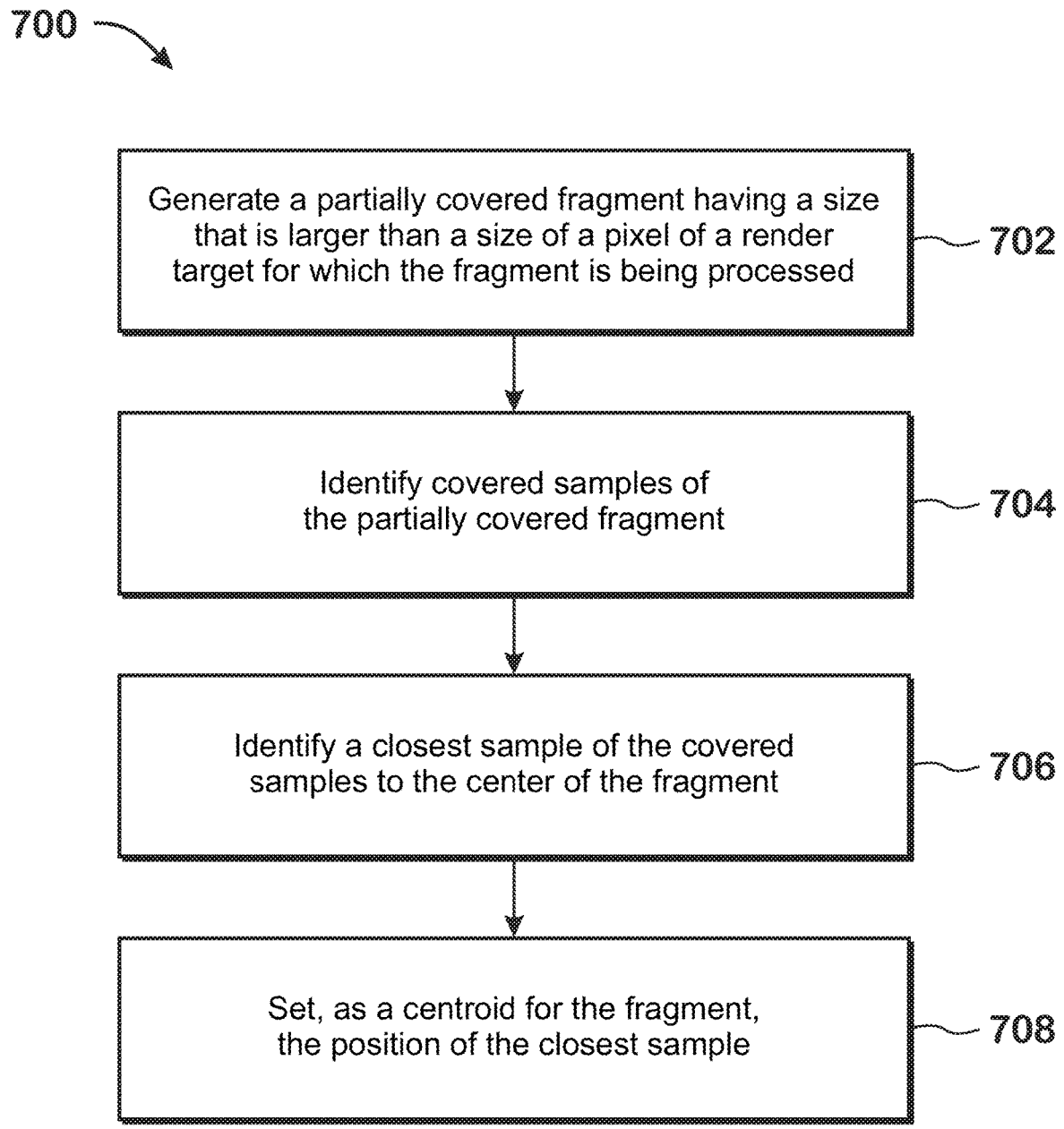
FIG. 7 is a flow diagram of a method for determining a centroid of a fragment, according to an example.

FIG. 7 is a flow diagram of a method 700 for determining a centroid of a fragment, according to an example. Although described with respect to the system of FIGS. 1-6, it should be understood that any system configured to perform the steps of the method 700 in any technically feasible order falls within the scope of the present disclosure.

The method 700 begins at step 702, where a rasterizer stage 314 generates a fragment that is partially covered by a triangle and that has a size that is larger than the pixels of a render target. The fragment having a size that is larger than the pixels of a render target means that the fragment is generated using a shading rate other than 1:1 (such as a ½ or ¼ shading rate). A partially covered fragment is a fragment that has some, but not all, of its samples covered by the triangle. At step 704, the rasterizer stage 314 identifies covered samples of the partially covered fragment. At step 706, the rasterizer stage 314 identifies the closest sample to the center of the fragment, out of those covered samples. At step 708, the rasterizer stage 314 sets, as the centroid for the fragment, the position of that closest sample.

The centroid is used (e.g., by the pixel shader stage 316) to evaluate attributes such as texture coordinates, which are used for texture lookups to color the fragment. The centroid is also used in quad-based derivative calculation of texture coordinates to determine mipmap level and texture filtering mode.

In some examples, the distance of the covered samples to the center are Manhattan distances, although any technically feasible distance can be used. In some examples, the rasterizer stage 314 includes multiple hardware Manhattan distance calculators operating in parallel and a comparator that selects the lowest Manhattan distance.

For fragments that are fully covered (all samples are covered), the centroid is set to the center of the pixel.

It should be understood that many variations are possible based on the disclosure herein. Although features and elements are described above in particular combinations, each feature or element can be used alone without the other features and elements or in various combinations with or without other features and elements. One example is an alternative technique for populating the tile buffer 510 described above. More specifically, in the technique described above, the rasterizer stage 314 first generates quads and then accumulates those quads into the tile buffer 510. In another technique, the rasterizer stage 314 generates the quads in the tile buffer 510 directly and does not need to perform the two separate steps of generating the quads and then accumulating those quads into the tile buffer 510.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing graphics rendering operations, the method comprising:
generating, by a processor, a partially covered fragment having a size that is larger than a size of a pixel of a render target for which the fragment is being processed;
identifying, by the processor, covered samples of the partially covered fragment;
identifying, by the processor, a closest sample of the covered samples to a center of the fragment;
setting, by the processor, as a centroid for evaluation of attributes of the fragment for a pixel shader stage, a position of the closest sample; and
shading, by the processor, the fragment based on the centroid.

2. The method of claim 1, wherein:
the attributes include a texture coordinate for the fragment.

3. The method of claim 2, further comprising:
determining, by the processor, the texture coordinate for the fragment at the centroid to evaluate the attributes of the fragment for the pixel shader stage.

4. The method of claim 2, further comprising:
determining, by the processor, a color for the partially covered fragment based on the texture coordinate.

5. The method of claim 1 further comprising:
calculating, by the processor, derivatives for a texture coordinates evaluated at the centroid of the fragment and for texture coordinates evaluated at centroids of three other pixels of a quad.

6. The method of claim 1, wherein identifying the closest sample comprises:
identifying, as the closest sample, the covered sample of the covered samples that has the closest Manhattan distance to the center of the fragment.

7. The method of claim 6, wherein identifying the covered sample having the closest Manhattan distance comprises:
calculating, with a plurality of Manhattan distance calculators, Manhattan distances for each of the covered samples in parallel; and
selecting, via a comparator, the covered sample having the shortest of the Manhattan distances.

8. The method of claim 1, further comprising:
rasterizing, by the processor, a triangle at a shading rate that is not 1:1 to generate the partially covered fragment.

9. The method of claim 1, further comprising:
generating, by the processor, a fully covered fragment having a size that is larger than a size of a pixel of a render target for which the fully covered fragment is being processed; and setting, by the processor, the center of the fully covered fragment as the centroid for the fully covered fragment.

10. A graphics processing pipeline configured to perform graphics rendering operations, the graphics processing pipeline comprising:
a rasterizer stage, configured to:
generate a partially covered fragment having a size that is larger than a size of a pixel of a render target for which the fragment is being processed;
identify covered samples of the partially covered fragment;
identify a closest sample of the covered samples to a center of the fragment; and
set, as a centroid for evaluation of attributes of the fragment for a pixel shader stage, a position of the closest sample; and
a pixel shader stage configured to shade the fragment based on the centroid.

11. The graphics processing pipeline of claim 10, wherein:
the attributes include a texture coordinate for the fragment.

12. The graphics processing pipeline of claim 11, wherein evaluation of the attributes includes determining the texture coordinate for the fragment at the centroid.

13. The graphics processing pipeline of claim 11, wherein shading the fragment comprises:
determining a color for the partially covered fragment based on the texture coordinate.

14. The graphics processing pipeline of claim 10, wherein shading the fragment comprises:
calculating derivatives for a texture coordinates evaluated at the centroid of the fragment and for texture coordinates evaluated at centroids of three other pixels of a quad.

15. The graphics processing pipeline of claim 10, wherein identifying the closest sample comprises:
identifying, as the closest sample, the covered sample of the covered samples that has the closest Manhattan distance to the center of the fragment.

16. The graphics processing pipeline of claim 15, wherein identifying the covered sample having the closest Manhattan distance comprises:
calculating, with a plurality of Manhattan distance calculators, Manhattan distances for each of the covered samples in parallel; and
selecting, via a comparator, the covered sample having the shortest of the Manhattan distances.

17. The graphics processing pipeline of claim 10, wherein the rasterizer stage is further configured to:
rasterize a triangle at a shading rate that is not 1:1 to generate the partially covered fragment.

18. The graphics processing pipeline of claim 10, wherein the rasterizer stage is further configured to:
generating a fully covered fragment having a size that is larger than a size of a pixel of a render target for which the fully covered fragment is being processed; and
setting, as the centroid for the fully covered fragment, the center of the fully covered fragment.

19. An accelerated processing device ("APD") comprising:
a compute unit configured to execute a pixel shader program; and
a graphics processing pipeline configured to performing graphics rendering operations, the graphics processing pipeline comprising:

a rasterizer stage, configured to:
  generate a partially covered fragment having a size that is larger than a size of a pixel of a render target for which the fragment is being processed;
  identify covered samples of the partially covered fragment;
  identify a closest sample of the covered samples to a center of the fragment; and
  set, as a centroid for evaluation of attributes of the fragment for a pixel shader stage, a position of the closest sample; and
a pixel shader stage configured to shade the fragment based on the centroid.

20. The APD of claim 19, wherein:
the attributes include a texture coordinate for the fragment.

\* \* \* \* \*